（12) United States Patent
Windpassinger et al.

(10) Patent No.: US 6,302,471 B1
(45) Date of Patent: Oct. 16, 2001

(54) INSULATING LAYER SECURED TO STRUTS BY CONNECTING ELEMENTS IN A MOTOR VEHICLE FOLDING CONVERTIBLE TOP

(75) Inventors: Martin Windpassinger, Hauzenberg; Manfred Kasparak, Neureichenau, both of (DE)

(73) Assignee: Parat Automotive Schonenbach GmbH + Co. KG, Remscheid (DE)

( * ) Notice: Subject to any disclaimer, the term of this patent is extended or adjusted under 35 U.S.C. 154(b) by 0 days.

(21) Appl. No.: 09/688,310

(22) Filed: Oct. 13, 2000

(30) Foreign Application Priority Data

Oct. 15, 1999 (DE) .................................. 199 49 865

(51) Int. Cl.⁷ ...................................... B60J 7/12
(52) U.S. Cl. .............................. 296/107.11; 296/107.01; 296/107.06
(58) Field of Search ................... 296/107.01, 107.04, 296/107.06, 107.09, 107.11, 107.12, 107.15, 108, 116, 118, 214

(56) References Cited

U.S. PATENT DOCUMENTS

| 2,455,926 | * | 12/1948 | Gessler et al. | 296/211 |
| 2,823,951 | * | 2/1958 | Stahl | 296/214 |
| 2,879,105 | * | 3/1959 | Stahl | 296/214 |
| 3,276,814 | * | 10/1966 | Podolan | 135/88.09 |
| 3,642,317 | * | 2/1972 | Swindlehurst | 296/214 |
| 4,323,276 | * | 4/1982 | Hira et al. | 296/214 |
| 4,964,668 |   | 10/1990 | Hofmann | 296/107 |
| 5,297,838 | * | 3/1994 | Cziptschirsch | 296/214 |
| 5,511,844 | * | 4/1996 | Boardman | 296/107.11 |
| 6,000,749 | * | 12/1999 | Adam et al. | 296/214 |
| 6,082,807 |   | 7/2000 | Hartmann et al. | 296/107.07 |

FOREIGN PATENT DOCUMENTS

| 6944515.4 | 4/1968 | (DE) . |
| 9206366.7 | 9/1992 | (DE) . |
| 92 09 122.9 | 12/1992 | (DE) . |
| 93 04 248.5 | 9/1994 | (DE) . |
| 29718206U1 | 4/1998 | (DE) . |

* cited by examiner

Primary Examiner—Joseph D. Pape
Assistant Examiner—Paul Chenevert
(74) Attorney, Agent, or Firm—Herbert Dubno; Andrew Wilford

(57) ABSTRACT

A motor-vehicle convertible top has a foldable and waterproof cover having an inner face, a framework having a plurality of rigid struts juxtaposed with the inner face and having ends at edges of the cover, reinforcing belts having outer faces provided at the strut ends with a directly bonded cushion layer engaging the cover inner face, and connecting elements securing the struts to the cover. The cushion layer is a foamed plastic bonded directly to the belt outer face. A foam-plastic insulating layer unitarily bonded to the inner face has a reduced thickness at the strut ends. A roof liner is bonded to mounting strips, which are therein attached to the struts.

9 Claims, 6 Drawing Sheets

INSULATING LAYER SECURED TO STRUTS BY CONNECTING ELEMENTS IN A MOTOR VEHICLE FOLDING CONVERTIBLE TOP

FIELD OF THE INVENTION

The present invention relates to a convertible top for a motor vehicle.

BACKGROUND OF THE INVENTION

A standard motor-vehicle convertible top normally comprises a folding framework overlain by a flexible cover. The cover is comprised in turn of a waterproof outer layer, an intermediate sound- and heat-insulating layer, and an inner head liner layer and forms a roof, a rear panel extending from a rear edge of the roof, and often even side panels extending from side edges of the roof and rear panel. Strong but flexible bands or belts extend along the side edges of the roof and rear panel on an inside face of the cover. The framework is comprised of a plurality of transversely extending rigid struts or hoops whose ends are normally fixed to the bands and that typically are hidden between the inner and outer layers of the cover. This framework allows the top to move between a folded down position normally recessed behind the passenger compartment and an up position stretched over the passenger compartment and connected to the upper edge of the windshield.

U.S. Pat. No. 4,964,668 describes such a vehicle top where the outer layer is a skin stretched over the struts which support the inner layer. The outer layer rests virtually directly on the support struts so that there is no insulation at these locations. In addition the outer layer is formed of stitched-together panels which require meticulous treatment to avoid leakage.

German utility model 297 18 206 describes another top where mounting strips secure the support struts directly to the outer layer and the intermediate layer is pinched between the outer layer and the struts. The top structure is fairly complex, requiring many steps to secure the various parts together. In the finished top there is a thermal bridge between the outer layer and the struts formed by the mounting strips.

Further arrangements described in German utility models 69 445 15, 92 06 366, 92 09 122, and 9304 248 are similarly complex. Their assembly is a complex operation and they often leave sites for water or heat to get through the top. The support struts are secured to the outer layer from which the intermediate insulating layer is suspended, or the latter is itself mounted on the struts.

OBJECTS OF THE INVENTION

It is therefore an object of the present invention to provide an improved motor-vehicle convertible top.

Another object is the provision of such an improved motor-vehicle convertible top which overcomes the above-given disadvantages, that is where the cover fits smoothly over the struts and belts.

SUMMARY OF THE INVENTION

A motor-vehicle convertible top has according to the invention a foldable and waterproof cover having an inner face, a framework having a plurality of rigid struts juxtaposed with the inner face and having ends at edges of the cover, reinforcing belts having outer faces provided at the strut ends with a directly bonded cushion layer engaging the cover inner face, and connecting elements securing the struts to the cover. The cushion layer is a foamed plastic bonded directly to the belt outer face. A foam-plastic insulating layer unitarily bonded to the inner face has a reduced thickness at the strut ends.

Thus the belts will slide smoothly on the cover as the top is opened and closed. When the top is up, the cover will pass smoothly over the cushioned strut ends and form an attractive and aerodynamically efficient shape. By providing the cushion layer directly on the belts whose ends are fixed at the frame members at the front and rear ends of the top telegraphing of the shapes of the struts through the roof is largely eliminated.

The insulating layer according to the invention can be interrupted at the belts. In this case the cushion layer directly engages the cover inner face and the cushion layer and belt together have an overall thickness equal substantially to a thickness of the insulating layer. Thus the belts are not visible through the cover.

The insulating layer and/or the cushion layer are according to the invention a high-pressure cast polyurethane. The polyurethane has a Shore D hardness of about 40, a polyol:isocyanate ratio of about 100:38 by weight, and a thickness of between 2 mm and 8 mm.

The cushion layers cover the entire outer faces of the belts. This reduces noise during high speed travel when the cover may be pulled by suction away from the belts. Furthermore to facilitate folding of the top the cushion layer is formed with thickness-reduced strips so that the belts fold at the strips.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
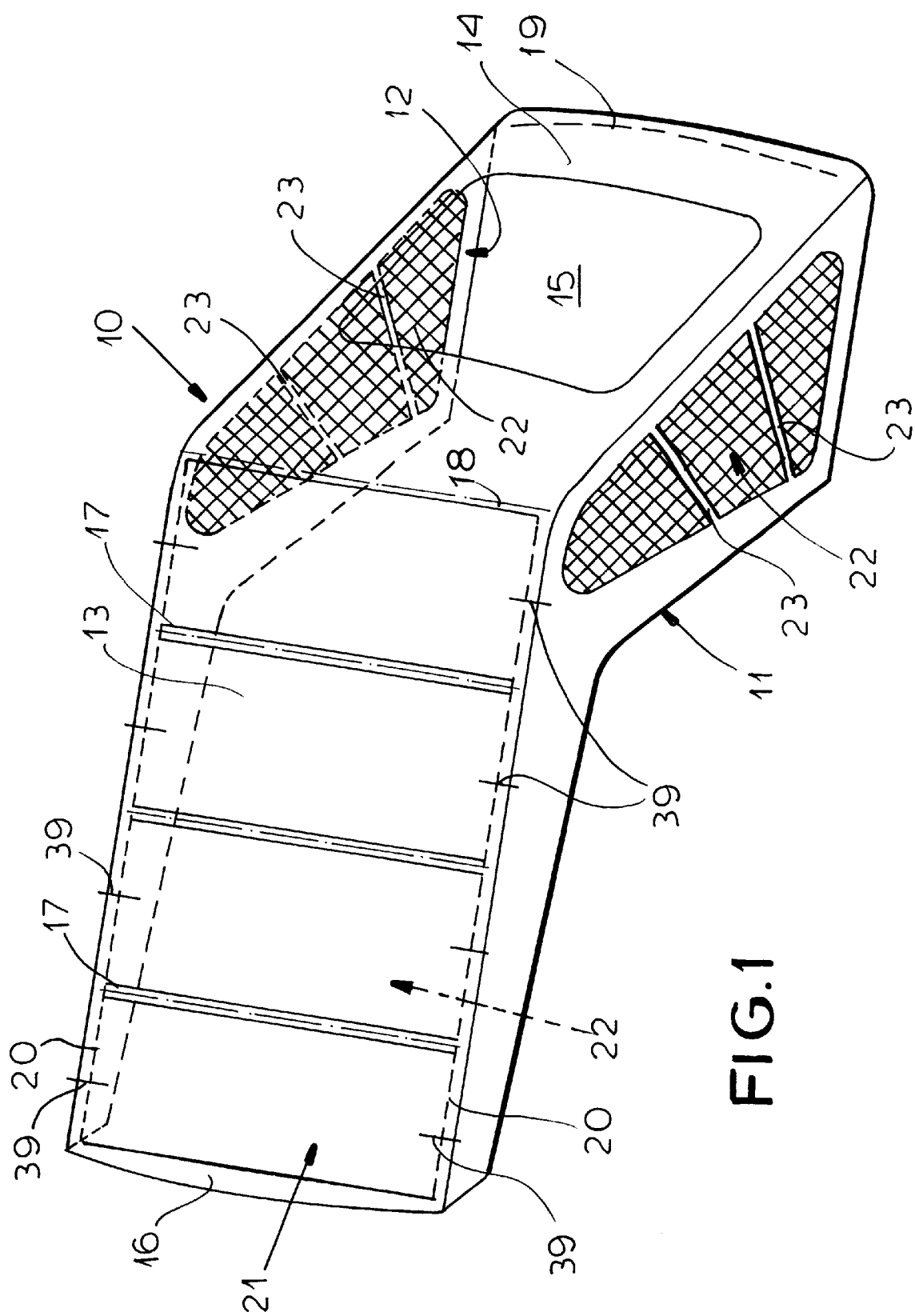
FIG. 1 is a partly diagrammatic small-scale perspective view of the convertible top according to the invention.

As seen in FIG. 1 a convertible top 10 according to the invention has a pair of closed sides 11 and 12, a roof 13, and a rear wall 14 provided with a window 15 secured in place as described in U.S. Pat. No. 6,082,807. A front bar 16 is secured by unillustrated clamps to the upper edge of an unillustrated windshield in an up or closed position. Metal transverse hoops or struts 17 extend between the sides 11 and 12 and one such strut 18 defines the rear of the roof 13 and top of the rear wall 14 while another such strut 19 defines the rear-wall lower edge. Reinforcing belts or bands 20 extend along the edges where the sides 11 and 12 meet the roof 13 and rear wall 14.

The top 10 has an cover 21 comprised of an outer lamina of polyacrylate, an intermediate lamina of rubber, polyurethane, or a butyl, and an inner textile lamina or web of polyester or a mixture of cotton and polyester. In the drawing the three laminae are not shown separately as they are standard. This cover 21 needs to be impervious to water and gas. Its inner face 21a is formed by a textile.

Figure 3:
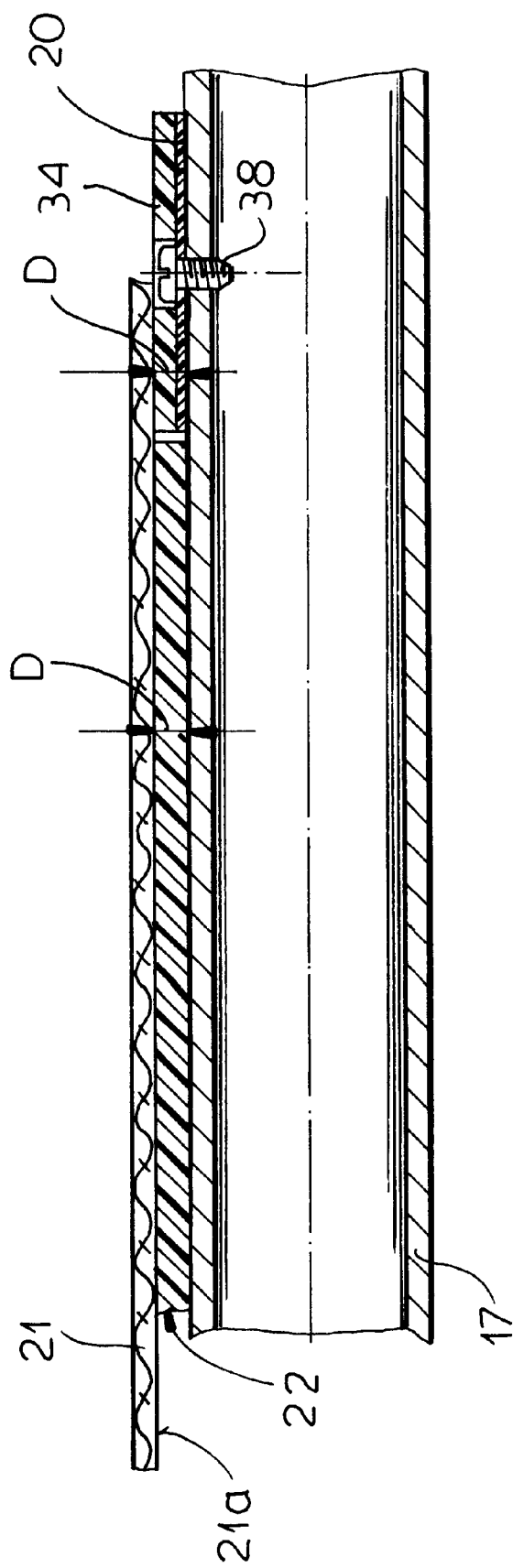

FIGS. 1 and 3 show how the roof part 13 and the sides 11 and 12 are provided with an inner insulating layer 22 shown by hatching and formed of a molded-in-situ closed-cell polyurethane. This insulating layer 22 extends over the entire inner surface of the outer layer 21 except at zones 23 in the side walls 11 and 12. The layer 22 covers seams in the outer layer 21 and, since the material of the layer 22 is waterproof, it seals at these regions and eliminates any need for special treatment here. The zones 23 are intended to promote folding at these locations, as the top 10 must fold in a predetermined manner in order to fit in its compartment in the vehicle when down. The inner layer 22 is comprised of a two-component polyurethane that is applied in a mold at a high pressure of 140 bar to 150 bar to the inner face 21a so that it bonds directly and unitarily thereto. It has a thickness D of between 2 mm and 8 mm and a Shore D hardness of about 40.

Figure 2:
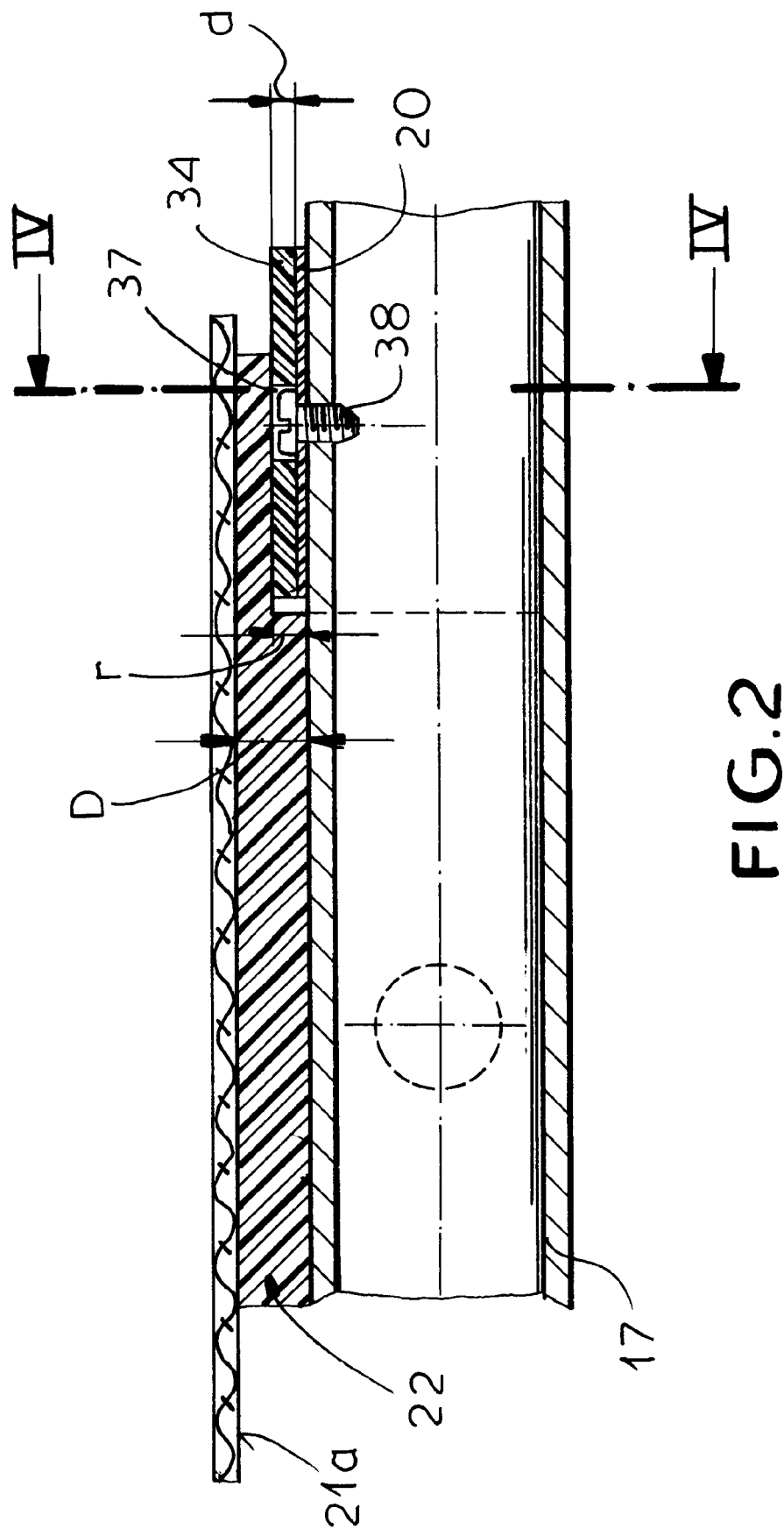
FIGS. 2 and 3 are cross sections through details of the top.
Figure 4:
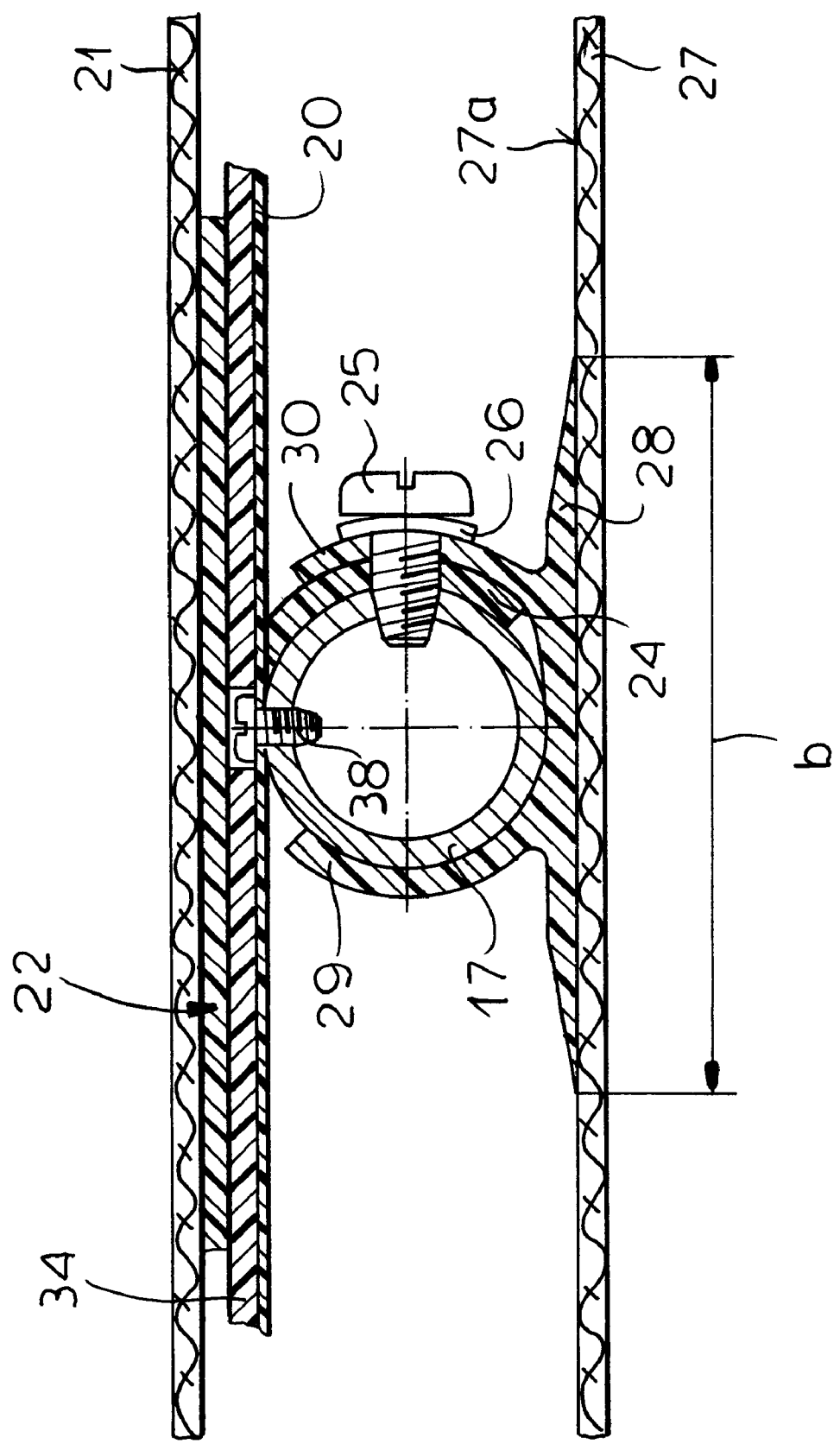
FIG. 4 is a section taken along line IV—IV of FIG. 2.

As shown in FIGS. 2 and 4 the belts 20 are provided at least where they pass over the struts 17 with an outer cushion layer 34 which is molded in place on them so as to bond directly to them. The layer 34 has a thickness d which, when added to the thickness of the belt 20 forms a thickness r. The cover 21 has over most of its area a thickness D but is reduced by the thickness r at the belts so that the cover 21 will stretch smoothly over the struts 17. The layer 34 is formed at each strut with an elongated hole 37 accommodating the head of a screw 38 passing through the belt 20 and securing it solidly to the strut 17.

In FIG. 3 the layer 22 is interrupted at the belt 20 and the belt 20 plus its cushion layer 34 have an overall thickness equal to D. Thus the cover 21 will not wrinkle or fold where it passes over the belt 20.

FIG. 4 further shows one of the struts 17, here constituted as a metal tube. The insulating layer 22 here is unitarily molded with an inwardly extending flap 24 that wraps partly around the strut 17 and is secured thereto by screws 25 and washers 26. A textile roof liner 27 has an inner face 27a to which is bonded a molded plastic mounting strip 28 having a pair of inwardly directed ribs 29 and 30 that embrace the strut 17 and flap 24. The screws 25 also pass through the ribs 30 to secure the liner 27 in place. The strip 28 has a width b equal to about twice the diameter of the strut 17.

Figure 5:
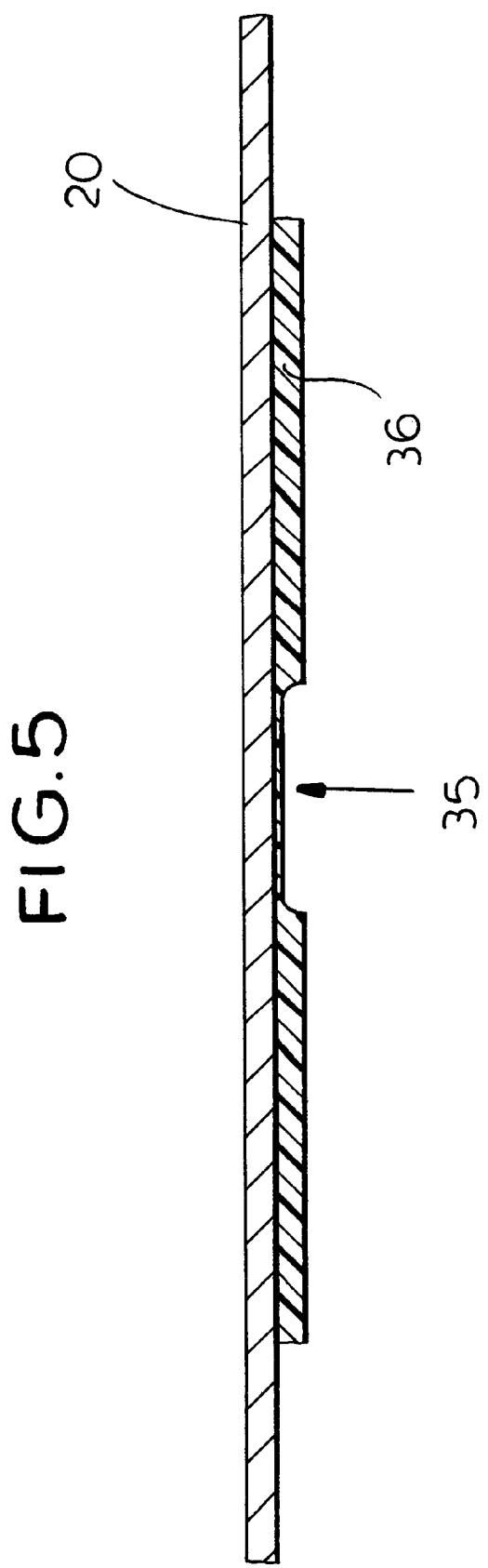
FIG. 5 is a longitudinal section through another detail of the top.
Figure 6:
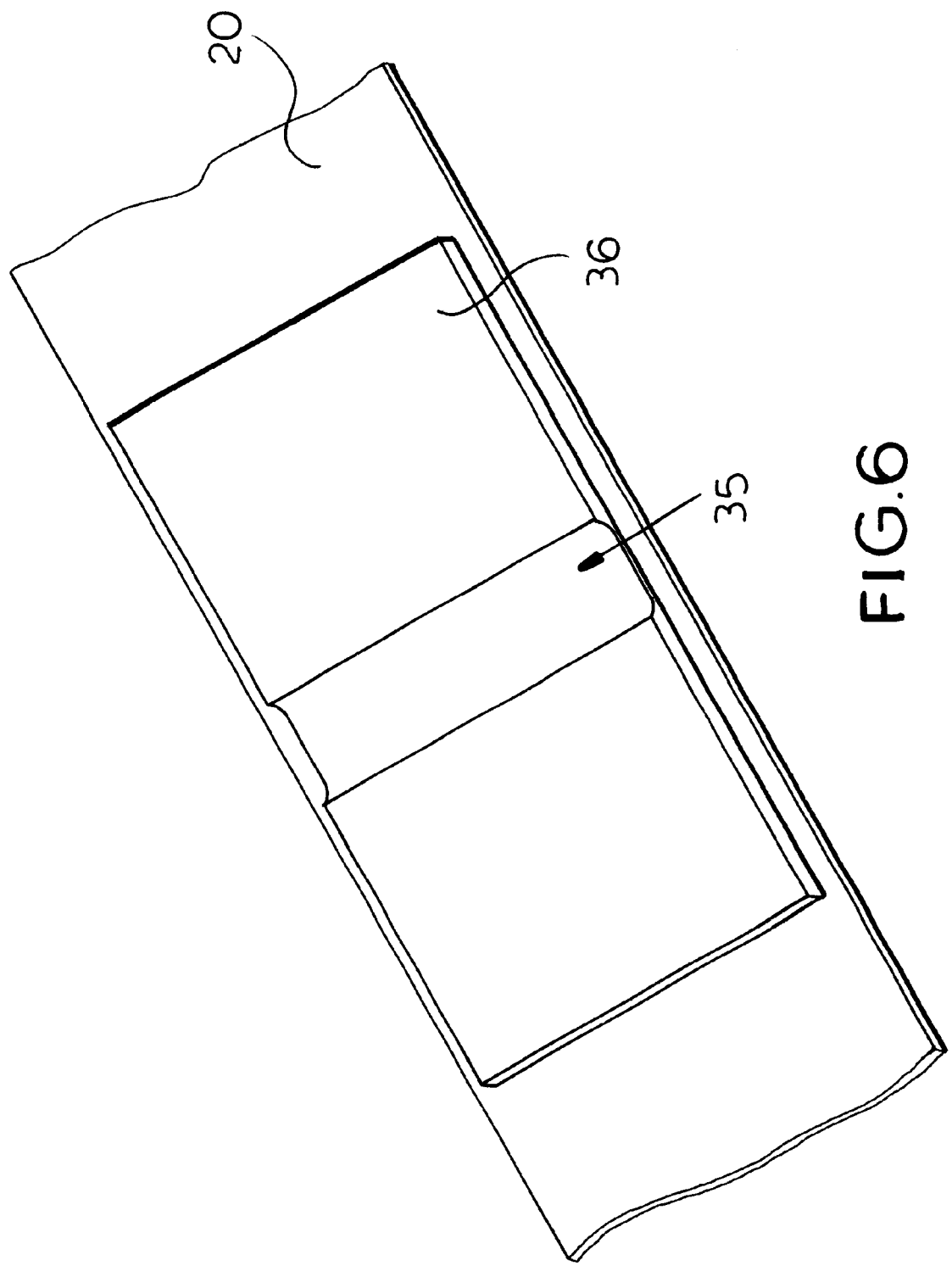
FIG. 6 is a perspective view of the detail shown in FIG. 5.

FIGS. 5 and 6 illustrate a molded-plastic inner layer 36 with a thickness-reduced strip 35 that serves for bending at this region. The molded plastic inner layer 36 is applied to one of the reinforcing belts 20. FIG. 1 shows at 39 locations where the strips 35 lie for folding of the cover 21 at these locations.

We claim:

1. A motor-vehicle convertible top comprising:
    a foldable and waterproof cover having an inner face;
    a framework having a plurality of rigid struts juxtaposed with the inner face and having ends at edges of the cover;
    reinforcing belts having outer faces;
    a cushion layer directly bonded to the outer faces at the strut end and engaging the cover inner face; and
    connecting elements securing the struts to the cover.

2. The motor-vehicle convertible top defined in claim 1 wherein the cushion layer is a foamed plastic bonded directly to the belt outer face.

3. The motor-vehicle convertible top defined in claim 1, further comprising
    a foam-plastic insulating layer unitarily bonded to the inner face and having a reduced thickness at the strut ends.

4. The motor-vehicle convertible top defined in claim 3 wherein the insulating layer is interrupted at the belts, the cushion layer directly engages the cover inner face, and the cushion layer and belt together have an overall thickness equal substantially to a thickness of the insulating layer.

5. The motor-vehicle convertible top defined in claim 3 wherein the insulating layer is a high-pressure cast polyurethane.

6. The motor-vehicle convertible top defined in claim 5 wherein the polyurethane has a Shore D hardness of about 40 and a polyol:isocyanate ratio of about 100:38 by weight.

7. The motor-vehicle convertible top defined in claim 6 wherein the insulating layer has a thickness of between 2 nm and 8 mm.

8. The motor-vehicle convertible top defined in claim 3 wherein the cushion layers cover the entire outer faces of the belts.

9. The motor-vehicle convertible top defined in claim 1 wherein the cushion layer is formed with thickness-reduced strips, whereby the belts fold at the strips.

* * * * *